(12) United States Patent
Neuman et al.

(10) Patent No.: US 7,056,588 B2
(45) Date of Patent: *Jun. 6, 2006

(54) HEAT TREATABLE COATED ARTICLE WITH ZINC OXIDE INCLUSIVE CONTACT LAYER(S)

(75) Inventors: George Neuman, Ann Arbor, MI (US); Philip J. Lingle, Temperance, MI (US); Ronald E. Laird, Dexter, MI (US); Thomas A Seder, Northville, MI (US); Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 6 days.

This patent is subject to a terminal disclaimer.

(21) Appl. No.: 11/067,944

(22) Filed: Mar. 1, 2005

(65) Prior Publication Data

US 2005/0145480 A1 Jul. 7, 2005

Related U.S. Application Data

(63) Continuation of application No. 10/400,080, filed on Mar. 27, 2003, now Pat. No. 6,887,575, which is a continuation-in-part of application No. 09/978,184, filed on Oct. 17, 2001, now Pat. No. 6,936,347, and a continuation-in-part of application No. 10/314,426, filed on Dec. 9, 2002, now Pat. No. 6,942,923.

(60) Provisional application No. 60/341,837, filed on Dec. 21, 2001.

(51) Int. Cl.
*B32B 9/00* (2006.01)

(52) U.S. Cl. ............ 428/432; 428/428; 428/697; 428/698; 428/699; 428/701; 428/702; 428/704

(58) Field of Classification Search ................ 428/428, 428/432, 697, 698, 699, 701, 702, 704
See application file for complete search history.

(56) References Cited

U.S. PATENT DOCUMENTS

| | | | |
|---|---|---|---|
| 3,682,528 A | 8/1972 | Apfel et al. |
| 4,786,783 A | 11/1988 | Woodward |
| 4,799,745 A | 1/1989 | Meyer et al. |
| 4,898,790 A | 2/1990 | Finley |
| 5,298,048 A | 3/1994 | Lingle et al. |
| 5,332,888 A | 7/1994 | Tausch et al. |

(Continued)

FOREIGN PATENT DOCUMENTS

EP 1 238 950 9/2002

(Continued)

OTHER PUBLICATIONS

U.S. Appl. No. 10/400,080, filed, Mar. 27, 2003.

*Primary Examiner*—Deborah Jones
*Assistant Examiner*—G. Blackwell
(74) *Attorney, Agent, or Firm*—Nixon & Vanderhye P.C.

(57) ABSTRACT

A coated article is provided so as to have a fairly high visible transmission (TY or $T_{vis}$) to sheet resistance ($R_s$) ratio (i.e., a ratio $T_{vis}/R_s$). The higher this ratio, the better the coated article's combined functionality of providing for both good solar performance (e.g., ability to reflect and/or absorb IR radiation) and high visible transmission. In certain example embodiments, coated articles herein may be heat treatable. Coated articles herein may be used in the context of insulating glass (IG) window units, architectural or residential monolithic window units, vehicle window units, and/or the like.

18 Claims, 2 Drawing Sheets

U.S. PATENT DOCUMENTS

| | | |
|---|---|---|
| 5,376,455 A | 12/1994 | Hartig et al. |
| 5,425,861 A | 6/1995 | Hartig et al. |
| 5,557,462 A | 9/1996 | Hartig et al. |
| 5,563,734 A | 10/1996 | Wolfe et al. |
| 5,688,585 A | 11/1997 | Lingle et al. |
| 5,800,933 A | 9/1998 | Hartig et al. |
| 5,821,001 A | 10/1998 | Arbab et al. |
| 5,935,702 A | 8/1999 | Macquart et al. |
| 6,014,872 A | 1/2000 | Hartig et al. |
| 6,045,896 A | 4/2000 | Boire et al. |
| 6,060,178 A | 5/2000 | Krisko |
| 6,132,881 A | 10/2000 | Hartig et al. |
| 6,159,607 A | 12/2000 | Hartig et al. |
| 6,322,881 B1 | 11/2001 | Boire et al. |
| 6,398,925 B1 | 6/2002 | Arbab et al. |
| 6,432,545 B1 | 8/2002 | Schicht et al. |
| 6,445,503 B1 | 9/2002 | Lingle |
| 6,475,626 B1 | 11/2002 | Stachowiak |
| 6,495,263 B1 | 12/2002 | Stachowiak |
| 6,524,688 B1 | 2/2003 | Eby et al. |
| 6,887,575 B1 * | 5/2005 | Neuman et al. ............ 428/428 |
| 2002/0021495 A1 | 2/2002 | Lingle |
| 2002/0031674 A1 | 3/2002 | Laird |
| 2002/0064662 A1 | 5/2002 | Lingle et al. |
| 2002/0102352 A1 | 8/2002 | Hartig et al. |
| 2002/0192474 A1 | 12/2002 | Lingle |
| 2003/0049464 A1 | 3/2003 | Glenn et al. |

FOREIGN PATENT DOCUMENTS

| | | |
|---|---|---|
| EP | 1 329 307 | 7/2003 |
| WO | WO 02/04375 | 1/2002 |
| WO | WO 02/26488 | 4/2002 |
| WO | WO 03/033427 | 4/2003 |
| WO | WO 2004/011382 | 2/2004 |

* cited by examiner

HEAT TREATABLE COATED ARTICLE WITH ZINC OXIDE INCLUSIVE CONTACT LAYER(S)

PRIORITY CLAIM AND CROSS-REFERENCE TO RELATED APPLICATIONS

This application is a Continuation of application Ser. No. 10/400,080, filed Mar. 27, 2003 now U.S. Pat. No. 6,887,575, which is a continuation-in-part (CIP) of each of U.S. patent application Ser. No. 09/978,184, filed Oct. 17, 2001 now U.S. Pat. No. 6,936,347; and Ser. No. 10/314,426, filed Dec. 9, 2002 now U.S. Pat. No. 6,942,923, based on Provisional 60/341,837, filed Dec. 21, 2001, all of which are hereby incorporated herein by reference.

BACKGROUND OF THE INVENTION

Windows including glass substrates with solar control coatings provided thereon are known in the art. Such windows may be used in the context of architectural windows, insulating glass (IG) window units, automotive windows, and/or the like.

Commonly owned US Patent Application Publication No. 2002/0192474 discloses a heat treatable (HT) low-E coating including a pair of silver layers and numerous dielectric layers. While this coating is certainly a good overall coating usable in applications such as windshields and architectural windows, it is problematic in certain respects.

For example, Example 1 in 2002/0192474 has a visible transmission (TY or $T_{vis}$), measured monolithically, of about 69.2% before heat treatment (HT) and about 79.51 after HT. Moreover, Example 1 of 2002/0192474 has a sheet resistance ($R_s$) of 4.30 before HT and 2.90 after HT (taking into account both IR reflecting silver layers). Thus, Example 1 in 2002/0192474 is characterized by a ratio of visible transmission to sheet resistance (i.e., ratio $T_{vis}/R_s$) of 16.1 before HT, and 27.4 after HT. Conventionally, this is a fairly high (good) ratio of visible transmission to sheet resistance compared to many other conventional coated articles.

It is known that if one wants to improve a coating's solar performance (e.g., infrared reflection), the thickness of the silver layer(s) can be increased in order to decrease the coating's sheet resistance. Thus, if one wants to improve a coating's solar performance by increasing its ability to reflect infrared (IR) rays or the like, one typically would increase the thickness of the IR blocking (or reflecting) silver layer(s). Unfortunately, increasing the thickness of the silver layer(s) causes visible transmission (TY or $T_{vis}$) to drop. Accordingly, in the past, it can be seen that when one sought to improve the solar performance of a coating in such a manner, it was at the expense of visible transmission. In other words, when solar performance was improved, visible transmission was sacrificed and decreased. Stated another way, it has been difficult to increase the ratio of visible transmission to sheet resistance (i.e., $T_{vis}/R_s$), especially if heat treatability and/or durability are to be provided. This is why many coatings that block (reflect and/or absorb) much IR radiation have rather low visible transmission.

An excellent way to characterize a coated article's ability to both allow high visible transmission and achieve good solar performance (e.g., IR reflection and/or absorption) is the coating's $T_{vis}/R_s$ ratio. The higher the $T_{vis}/R_s$ ratio, the better the combination of the coating's ability to both provide high visible transmission and achieve good solar performance.

As explained above, Example 1 in 2002/0192474 is characterized by a ratio of visible transmission to sheet resistance (i.e., $T_{vis}/R_s$) of 16.1 before HT, and 27.4 after HT, measured monolithically.

As another example, in U.S. Pat. No. 5,821,001 to Arbab, single silver Example 1 has a ratio $T_{vis}/R_s$ of 10.7 before HT, and 19.5 after HT. Double silver Example 2 of the '001 patent has a ratio $T_{vis}/R_s$ of 14.4 before HT, and 22.1 after HT.

As another example, the non-heat treatable version of Example 1 of U.S. Pat. No. 6,432,545 to Schicht relates to a single silver layer stack (not a double silver stack) having a ratio $T_{vis}/R_s$ of 19.8 with no HT. The heat treatable version of Example 1 of U.S. Pat. No. 6,432,545 (which has a pre-HT $T_{vis}$ of 70%) also relates to a single silver layer stack, but has a ratio $T_{vis}/R_s$ of 16.7 before HT, and 28.8 after HT.

It can be seen from the above that commercially acceptable conventional heat treatable coatings cannot achieve very high $T_{vis}/R_s$ ratios, thereby illustrating that their combined characteristic of visible transmission relative to sheet resistance (and solar performance) can be improved.

In the past, it has been theoretically possible to increase the $T_{vis}/R_s$ ratio, but not in a commercially acceptable manner. For example, U.S. Pat. No. 4,786,783 alleges that a coated article therein has a rather high $T_{vis}/R_s$ ratio (the 76.4% visible transmission alleged in this patent is suspect to some extent in view of the very thick silver layers in Example 2). However, even if one were to believe the data in the '783 patent, the coated articles therein are not commercially acceptable.

For example, Example 2 of the '783 patent can only achieve the alleged visible transmission of 76.4% by not including sufficient protective dielectric layer(s) or silver protecting layer(s). For example, Example 2 of the '783 patent has, inter alia, no protective contact layers (e.g., Ni, NiCr, Cr, $NiCrO_x$, ZnO, Nb, or the like) between the bottom titanium oxide layer and silver layer to protect the silver during HT (protective contact layers reduce visible transmission, but protect the silver during HT). In other words, Example 2 of U.S. Pat. No. 4,786,783 could not survive heat treatment (e.g., heat bending, tempering, and/or heat strengthening) in a commercially acceptable manner. If Example 2 of the '783 patent was heat treated, the sheet resistance would effectively disappear because the silver layer(s) would heavily oxidize and be essentially destroyed, thereby leading to unacceptable optical properties such as massive (very high) haze, very large $\Delta E^*$ values, and unacceptable coloration. For example, because Example 2 of the '783 patent does not use sufficient layer(s) to protect the silver during HT, the coated article would have very high $\Delta E^*$ values (glass side reflective and transmissive) due to heat treatment; $\Delta E^*$ over 10.0 and likely approaching 20.0 or more (for a detailed discussion on the meaning of $\Delta E^*$, see U.S. Pat. Nos. 6,495,263 and/or 6,475,626, both of which are hereby incorporated herein by reference). Clearly, this is not a commercially acceptable heat treatable product.

Thus, in certain instances, it may be desirable to: (a) increase visible transmission without sacrificing solar performance, (b) improve solar performance without sacrificing visible transmission, and/or (c) improve both solar performance and visible transmission. In other words, it may sometimes be desirable if the $T_{vis}/R_s$ ratio could be increased, in a coating that may be heat treated in a commercially acceptable manner. For example, it may be desirable to achieve (a), (b) and/or (c) while simultaneously being able to keep the $\Delta E^*$ value (glass side reflective and/or transmissive) due to HT below 8.0 or the like.

BRIEF SUMMARY OF EXAMPLE EMBODIMENTS OF THE INVENTION

In certain example embodiments of this invention, there is provided a heat treatable coated article having a visible transmission (TY or $T_{vis}$) to sheet resistance ($R_s$) ratio (i.e., a ratio $T_{vis}/R_s$) of at least 30 after heat treatment (HT), more preferably of at least 32 after HT, even more preferably of at least 34 after HT, and most preferably of at least 36 after HT. In certain example embodiments, the coated article is heat treatable in a commercially acceptable manner in that: (i) its $\Delta E^*$ value (glass side reflective and/or transmissive) due to HT is no greater than about 8.0, more preferably no greater than about 5.0, even more preferably no greater than about 4.0, even more preferably no greater than about 3.0, and sometimes no greater than 2.5; and/or (ii) the coating includes at least one metal inclusive contact layer (e.g., Ni, NiCr, Cr, Ti, TiO, $NiCrO_x$, ZnO, ZnAlO, Nb, mixtures thereof, or the like) between an IR reflecting layer (e.g., silver layer) and a dielectric layer so as to protect the IR reflecting layer during HT.

In certain example embodiments, the example non-limiting layer stacks themselves, with respect to materials, stoichiometries and/or thicknesses may provide for the rather high ratios $T_{vis}/R_s$ to be coupled with heat treatable coated articles. However, other factors may also be involved.

For example, in certain example embodiments, it has surprisingly been found that the use of a combination of a Si-rich silicon nitride inclusive layer and a zinc oxide inclusive layer (e.g., ZnO or $ZnAlO_x$) under a layer comprising silver allows the silver be deposited (e.g., via sputtering or the like) in a manner which causes its sheet resistance to be lessened compared to if other material(s) were under the silver. In certain example embodiments, a surprising finding is that the Si-rich silicon nitride inclusive ($Si_xN_y$) layer(s) allows the ratio $T_{vis}/R_s$ to be increased significantly after HT (e.g., heat strengthening, thermal tempering, and/or heat bending). While it is not certain why this Si-rich layer $Si_xN_y$ works in such a manner, it is believed that the presence of free Si in the Si-rich silicon nitride inclusive layer may allow many atoms such as sodium (Na) which migrate outwardly from the glass during HT to be stopped by the Si-rich silicon nitride inclusive layer before they can reach the silver and damage the same. Thus, it is believed that the oxidation caused by heat treatment allows visible transmission to increase, and that the Si-rich $Si_xN_y$ layer(s) reduces the amount of damage done to the silver layer(s) during HT thereby allowing sheet resistance ($R_s$) to decrease in a satisfactory manner. Also, the Si-rich nature of this layer is believed to be responsible for the surprise finding that coated articles herein may be heat bent to a greater extent (e.g., for a longer and/or hotter period of HT to enable deeper bends to be formed in the articles) than certain conventional coated articles.

In certain example embodiments, the Si-rich $Si_xN_y$ layer(s) is characterized in that x/y may be from 0.76 to 1.5, more preferably from 0.8 to 1.4, still more preferably from 0.85 to 1.2. The Si-rich layer is typically non-stoichiometric, and may include free Si therein as deposited. Moreover, in certain example embodiments. before and/or after HT the Si-rich $Si_xN_y$ layer(s) may have an index of refraction "n" of at least 2.05, more preferably of at least 2.07, and sometimes at least 2.10 (e.g., at 632 nm).

As another example, in certain example embodiments, it has surprisingly been found that by depositing upper and lower zinc oxide inclusive contact layers using different partial pressures (e.g., oxygen partial pressure), the sheet resistance of the coating can be decreased before and/or after HT thereby providing for improved solar performance. In certain example embodiments, the sheet resistance of the coating (taking the sheet resistance(s) of all silver inclusive layer(s) into account) can be reduced when the zinc oxide inclusive contact layer for the upper silver layer is sputter deposited at a lower gas pressure than the zinc oxide inclusive contact layer for the lower silver layer.

In other example embodiments of this invention the example layer stacks herein may allow for a more neutral colored (transmissive and/or glass side reflective) coated article to be provided. In certain example embodiments, before and/or after HT, measured monolithically, certain example coated articles herein may have transmissive color as follows: $a^*_T$ from −4.5 to +1.0, more preferably from −3.0 to 0.0; and $b^*_T$ from −1.0 to +4.0, more preferably from 0.0 to 3.0. The transmissive b* value may be advantageous in certain example embodiments, for example, because the transmissive color is not too blue (blue becomes more prominent as the b* value becomes more negative). If used in an IG window unit, the colors may change slightly. For example, the transmissive b* values may become more positive (e.g., from 0 to 3.0) in an IG unit. With respect to glass side reflective color (as opposed to transmissive color), in certain example embodiments, before and/or after HT and measured monolithically and/or when coupled to another substrate(s), certain example coated articles herein may have glass side reflective color as follows: $a^*_G$ from −4.5 to +2.0, more preferably from −3.0 to 0.0; and $b^*_T$ from −5.0 to +4.0, more preferably from −4.0 to 3.0.

In certain example embodiments, coated articles (monolithic and/or IG units) herein may have a SHGC (e.g., surface #2 of an IG unit) of no greater than 0.45 (more preferably no greater than 0.41, and most preferably no greater than 0.40), and/or a TS % of no greater than 40% (more preferably no greater than 36%, and most preferably no greater than 34%).

In certain example embodiments of this invention, there is provided a heat treated coated article comprising: a multi-layer coating supported by a glass substrate, wherein the coating comprises at least one layer comprising silver; and wherein the coated article has a ratio $T_{vis}/R_s$ of at least 30 after heat treatment (where $T_{vis}$ is visible transmission (%) and $R_s$ is sheet resistance of the coating in units of ohms/square) and a $\Delta E^*$ value (glass side reflective and/or transmissive) of less than or equal to about 8 due to the heat treatment.

In other example embodiments of this invention, there is provided a coated article including a coating supported by a glass substrate, wherein the coating comprises from the glass substrate outwardly: a layer comprising Si-rich silicon nitride $Si_xN_y$, where x/y is from 0.85 to 1.2; a layer comprising zinc oxide contacting the layer comprising Si-rich silicon nitride; and a layer comprising silver contacting the layer comprising zinc oxide.

In still other example embodiments of this invention, there is provided a method of making a coated article, the method comprising: providing a glass substrate; sputtering a first zinc oxide inclusive layer over a first layer comprising silicon nitride on the substrate using a first oxygen partial pressure; sputtering a first layer comprising silver directly on the first zinc oxide inclusive layer; sputtering a second zinc oxide inclusive layer over a second layer comprising silicon nitride on the substrate using a second oxygen partial pressure, wherein the second zinc oxide inclusive layer is above the first zinc oxide inclusive layer; and wherein the first oxygen partial pressure is greater than the second oxygen partial pressure.

DETAILED DESCRIPTION OF EXAMPLE EMBODIMENTS OF THE INVENTION

Figure 1:
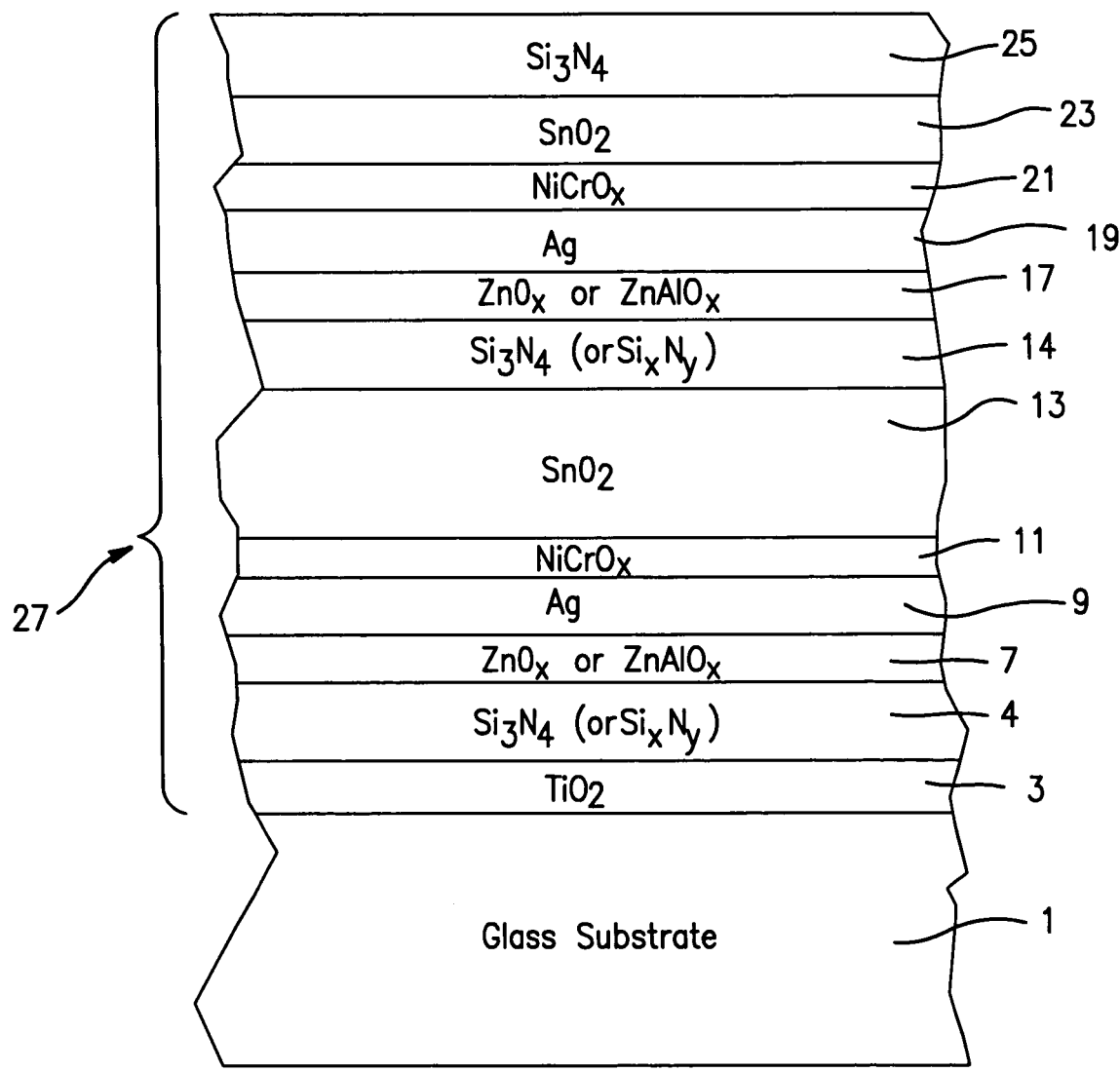
FIG. 1 is a cross sectional view of a monolithic coated article according to an example embodiment of this invention.

In certain example embodiments of this invention, coated articles may be provided so as to have a fairly high visible transmission (TY or $T_{vis}$) to sheet resistance ($R_s$) ratio (i.e., a ratio $T_{vis}/R_s$). The higher this ratio, the better the coated article's combined functionality of providing for both good solar performance (e.g., ability to reflect and/or absorb IR radiation) and high visible transmission. In certain example embodiments, coated articles herein may be heat treatable. In certain example embodiments, coated articles herein may also be characterized by fairly neutral color (transmissive and/or glass side reflective).

Coated articles herein may be used in the context of insulating glass (IG) window units, architectural window units, residential window units (e.g., IG and/or monolithic), vehicle window units such as laminated windshields, backlites, or sidelites, and/or other suitable applications.

Coated articles herein may have one or more infrared (IR) reflecting layers, which typically comprise or consist essentially of silver (Ag), gold (Au), or the like. Thus, this invention relates to double silver stacks (preferably), but also relates to single silver stacks, and other types of stacks encompassed by one or more claims.

In certain example embodiments of this invention, a coated article is provided so as to have: (a) a visible transmission to sheet resistance ratio (i.e., a ratio $T_{vis}/R_s$) of at least 30 after heat treatment (HT), more preferably of at least 32 after HT, even more preferably of at least 34 after HT, and most preferably of at least 36 after HT; and/or (b) a ratio $T_{vis}/R_s$ of at 20 before HT, more preferably of at least 22 before HT, even more preferably of at least 25 before HT, and most preferably of at least 28 before HT (coated articles herein may or may not be heat treated in different embodiments). In certain example embodiments, coated articles are heat treatable in a commercially acceptable manner in that: (i) coated articles may have a ΔE* value (glass side reflective and/or transmissive) due to HT is no greater than about 8.0, more preferably no greater than about 5.0, even more preferably no greater than about 4.0, even more preferably no greater than about 3.0, and sometimes no greater than about 2.5; and/or (ii) coatings may include at least one metal inclusive contact layer (e.g., Ni, NiCr, Cr, Ti, TiO, NiCrO$_x$, ZnO, ZnAlO, Nb, mixtures thereof, or any other suitable material) between a silver layer and a dielectric layer so as to protect the IR reflecting layer(s) (e.g., silver or the like) such as during HT or other processing.

Factors which may contribute to the surprisingly high $T_{vis}/R_s$ ratios herein include one or more of: (a) example layer stack portions described herein, (b) example layer stoichiometries herein, (c) example layer thicknesses herein, (d) the use of a Si-rich silicon nitride inclusive layer under at least one IR reflecting layer herein, and/or (e) the deposition of different zinc oxide inclusive layers at different oxygen partial pressures.

For example, in certain example embodiments, it has surprisingly been found that the use of a combination of a Si-rich silicon nitride inclusive layer and a zinc oxide inclusive layer (e.g., ZnO, ZnAlO$_x$, or ZnO containing other element(s)) under a layer comprising silver allows the silver be deposited (e.g., via sputtering or the like) in a manner which causes its sheet resistance to be lessened compared to if other material(s) were under the silver. In certain example embodiments, a surprising finding is that the Si-rich silicon nitride inclusive ($Si_xN_y$) layer(s) allows the ratio $T_{vis}/R_s$ to be increased significantly after HT (e.g., heat strengthening, thermal tempering, and/or heat bending). While it is not certain why this Si-rich layer $Si_xN_y$ works in such a manner, it is believed that the presence of free Si in the Si-rich silicon nitride inclusive layer may allow many atoms such as sodium (Na) which migrate outwardly from the glass during HT to be stopped by the Si-rich silicon nitride inclusive layer before they can reach the silver and damage the same. Thus, it is believed that the oxidation caused by heat treatment allows visible transmission to increase, and that the Si-rich $Si_xN_y$ layer(s) reduces the amount of damage done to the silver layer(s) during HT thereby allowing sheet resistance ($R_s$) to decrease in a desirable manner.

As another example, in certain example embodiments, it has surprisingly been found that by depositing upper and lower zinc oxide inclusive contact layers using different partial pressures (e.g., oxygen partial pressure), the sheet resistance of the coating can be decreased before and/or after HT thereby providing for improved solar performance. In certain example embodiments, the sheet resistance of the coating (taking the sheet resistance(s) of all silver inclusive or other IR reflecting layer(s) into account) can be reduced when the zinc oxide inclusive contact layer for the upper IR reflecting layer (e.g., silver) is sputter deposited at a lower gas partial pressure than the zinc oxide inclusive contact layer for the lower IR reflecting layer.

Another surprising result associated with certain example embodiments of this invention is that neutral coloration can be provided (transmissive and/or glass side reflective).

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and coating (or layer system) 27 provided on the substrate 1 either directly or indirectly. The coating (or layer system) 27 may include: optional titanium oxide layer 3 (e.g., a first dielectric layer), dielectric silicon nitride layer 4 which may be $Si_3N_4$, or a Si-rich type, first lower contact layer 7 which contacts and protects IR reflecting layer 9, first conductive and potentially metallic infrared (IR) reflecting layer 9, first upper contact layer 11 which contacts and protects IR reflecting layer 9, dielectric layer 13, another silicon nitride inclusive layer 14 (stoichiometric type or Si-rich type), second lower contact layer 17 which contacts and protects IR reflecting layer 19, second upper contact layer 21 which contacts and protects upper IR reflecting layer 19, dielectric layer 23, and finally protective dielectric layer 25. The "contact" layers 7, 11, 17 and 21 each contact at least one IR reflecting layer (e.g., Ag layer). The aforesaid layers 3–25 make up low-E (i.e., low emissivity) coating 27 which is provided on glass or plastic substrate 1.

In certain preferred embodiments of this invention, the thickness of titanium oxide layer 3 is controlled so as to allow glass side reflective a* and/or b* values that are fairly neutral (i.e., close to zero) at high viewing angles such as 45 and/or 60 degrees. In this respect, the low glass side reflective a* and/or b* color values described herein are achieved by, inter alia, controlling the thickness of titanium oxide layer 3 so as to be from 20 to 60 Å, more preferably from 30 to 60 Å, and even more preferably from 40 to 50 Å.

Infrared (IR) reflecting layers 9 and 19 are preferably metallic and/or conductive, and may comprise or consist essentially of silver (Ag), gold, or any other suitable IR reflecting material. These IR reflecting layers help allow coating 27 to have low-E and/or good solar control characteristics. The IR reflecting layer(s) may be slightly oxidized in certain embodiments of this invention.

The upper contact layers 11 and 21 may be of or include nickel (Ni) oxide, chromium/chrome (Cr) oxide, or a nickel alloy oxide such as nickel chrome oxide (NiCrO$_x$), or other suitable material(s), in certain example embodiments of this invention. The use of, for example, NiCrO$_x$ for/in these layers allows durability to be improved. The NiCrO$_x$ layers may be fully oxidized in certain embodiments of this invention (i.e., fully stoichiometric), or may be at least about 50% oxidized in other embodiments of this invention. While NiCrO$_x$ is a preferred material for these contact layers, those skilled in the art will recognize that other materials may instead be used. Contact layers 11 and/or 21 (e.g., of or including NiCrO$_x$) may or may not be oxidation graded in different embodiments of this invention. Oxidation grading means that the degree of oxidation in the layer(s) changes throughout the thickness of the layer(s) so that for example a contact layer may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers 11 and 21 are set forth in U.S. Published Patent Application No. 2002/0064662, the disclosure of which is hereby incorporated herein by reference.

Lower contact layers 7 and 17 may comprise zinc oxide (e.g., ZnO) in certain example embodiments of this invention. The zinc oxide may contain Al (e.g., to form ZnAlO) or other element(s) in certain example embodiments. In certain alternative embodiments of this invention, another layer (e.g., an oxide of NiCr, an oxide of Ni, or the like) may be provided between the zinc oxide inclusive layer 7 (or 17) and the nearest IR reflecting layer 9 (or 19).

Silicon nitride inclusive dielectric layer(s) 4 and/or 14 is/are provided so as to, among other things, improve heat-treatability of the coated articles, e.g., such as thermal tempering or the like. Moreover, as explained above, in certain example embodiments, it has surprisingly been found that the use of a combination of a Si-rich silicon nitride inclusive layer (4 and/or 14) and a zinc oxide inclusive layer (e.g., ZnO or ZnAlO$_x$) (7 and/or 17) under a layer comprising silver (9 and/or 19) allows the silver to be deposited (e.g., via sputtering or the like) in a manner which causes its sheet resistance to be lessened compared to if certain other material(s) were under the silver. In certain example embodiments, a surprising finding is that the Si-rich silicon nitride inclusive (Si$_x$N$_y$) layer(s) allows the ratio T$_{vis}$/R$_s$ to be increased significantly after HT (e.g., heat strengthening, thermal tempering, and/or heat bending). It is believed that the presence of free Si in the Si-rich silicon nitride inclusive layer(s) (4 and/or 14) may allow certain atoms such as sodium (Na) which migrate outwardly from the glass 1 during HT to be stopped by the Si-rich silicon nitride inclusive layer before they can reach the silver and damage the same. Thus, it is believed that the oxidation caused by heat treatment allows visible transmission to increase, and that the Si-rich Si$_x$N$_y$ layer(s) reduces the amount of damage done to the silver layer(s) during HT thereby allowing sheet resistance (R$_s$) to decrease in a satisfactory manner.

In certain example embodiments, one or both of the potentially Si-rich silicon nitride layers 4 and/or 14 may be characterized by Si$_x$N$_y$ layer(s), where x/y may be from 0.76 to 1.5, more preferably from 0.8 to 1.4, still more preferably from 0.85 to 1.2. Moreover, in certain example embodiments, before and/or after HT the Si-rich Si$_x$N$_y$ layer(s) (4 and/or 14) may have an index of refraction "n" of at least 2.05, more preferably of at least 2.07, and sometimes at least 2.10 (e.g., 632 nm) (note: stoichiometric Si$_3$N$_4$ has an index "n" of 2.04). Also, the Si-rich Si$_x$N$_y$ layer(s) (4 and/or 14) in certain example embodiments may have an extinction coefficient "k" of at least 0.001, more preferably of at least 0.003 (note: stoichiometric Si$_3$N$_4$ has an extinction coefficient "k" of effectively 0).

Dielectric layer 13 acts as a coupling layer between the two halves of the coating 27, and is of or includes tin oxide in certain embodiments of this invention. However, other dielectric materials may instead be used for layer 13.

Dielectric layers 23 and 25 may allow the environmental resistance of the coating 27 to be improved, and are also provided for color purposes. In certain example embodiments, dielectric layer 23 may be of or include tin oxide (e.g., SnO$_2$), although other materials may instead be used. Dielectric overcoat layer 25 may be of or include silicon nitride (e.g., Si$_3$N$_4$) in certain embodiments of this invention, although other materials may instead be used such as titanium dioxide, silicon oxynitride, tin oxide, zinc oxide, niobium oxide, or the like such as dielectrics with an index of refraction "n" from 1.6 to 3.0. Layer 23 (and/or other layers in FIG. 1) may be omitted in certain example embodiments of this invention.

Other layer(s) below or above the illustrated coating 27 may also be provided. Thus, while the layer system or coating 27 is "on" or "supported by" substrate 1 (directly or indirectly), other layer(s) may be provided therebetween. Thus, for example, coating 27 of FIG. 1 may be considered "on" and "supported by" the substrate 1 even if other layer(s) are provided between layer 3 and substrate 1. Moreover, certain layers of coating 27 may be removed in certain embodiments, while others may be added between the various layers or the various layer(s) may be split with other layer(s) added between the split sections in other embodiments of this invention without departing from the overall spirit of certain embodiments of this invention.

Figure 2:
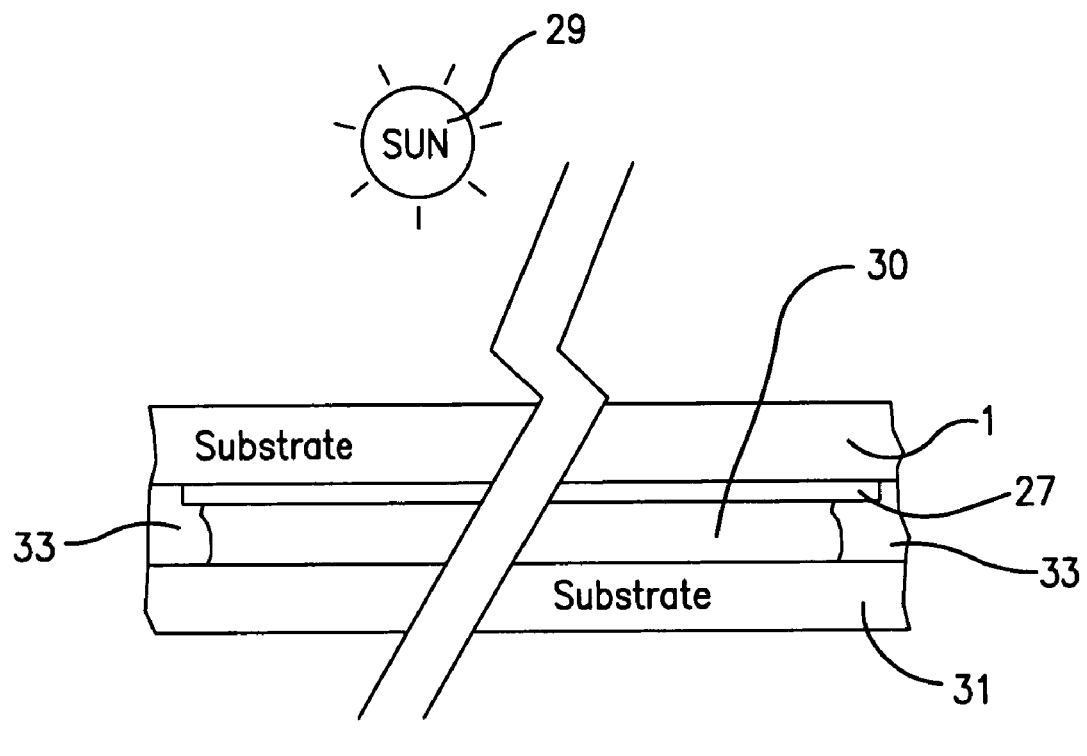
FIG. 2 is a cross sectional view of the coated article of FIG. 1 being used in an IG window unit according to an example embodiment of this invention.

FIG. 2 illustrates the coating or layer system 27 being utilized on surface #2 of an IG window unit. Coatings 27 according to any embodiment herein may be used in IG units as shown in FIG. 2. In order to differentiate the "inside" of the IG unit from its "outside", the sun 29 is schematically presented on the outside. The IG unit includes outside glass pane or sheet (i.e., substrate 1 from FIG. 1) and inside glass pane or sheet 31. These two glass substrates (e.g. float glass 1–10 mm thick) are sealed at their peripheral edges by a conventional sealant and/or spacer 33 and may be provided with a conventional desiccant strip (not shown). The panes may then be retained in a conventional window or door retaining frame. By sealing the peripheral edges of the glass sheets and optionally replacing the air in insulating space (or chamber) 30 with a gas such as argon, a typical, high insulating value IG unit is formed. Optionally, insulating space 30 may be at a pressure less than atmospheric pressure in certain alternative embodiments (with or without a gas in space 30), although this of course is not necessary in all embodiments. While the inner side of substrate 1 is provided with coating 27 in FIG. 2, this invention is not so limited (e.g., coating 27 may instead be provided on the interior surface of substrate 31 in other embodiments of this invention).

Turning back to FIG. 1, while various thicknesses may be used in different embodiments of this invention, example thicknesses and materials for the respective layers on the glass substrate 1 in the FIG. 1 embodiment are as follows, from the glass substrate outwardly:

TABLE 1

(Example Materials/Thicknesses; FIG. 1 Embodiment)

| Layer | Preferred Range (Å) | More Preferred (Å) | Example (Å) |
|---|---|---|---|
| $TiO_x$ (layer 3) | 20–400 Å | 20–60 Å | 40 Å |
| $Si_xN_y$ (layer 4) | 50–450 Å | 90–200 Å | 113 Å |
| $ZnO_x$ (layer 7) | 10–300 Å | 40–150 Å | 100 Å |
| Ag (layer 9) | 50–250 Å | 80–120 Å | 95 Å |
| $NiCrO_x$ (layer 11) | 10–100 Å | 15–35 Å | 26 Å |
| $SnO_2$ (layer 13) | 0–1,000 Å | 350–800 Å | 483 Å |
| $Si_xN_y$ (layer 14) | 50–450 Å | 90–200 Å | 113 Å |
| $ZnO_x$ (layer 17) | 10–300 Å | 40–150 Å | 100 Å |
| Ag (layer 19) | 50–250 Å | 80–220 Å | 131 Å |
| $NiCrO_x$ (layer 21) | 10–100 Å | 15–35 Å | 26 Å |
| $SnO_2$ (layer 23) | 0–750 Å | 70–200 Å | 100 Å |
| $Si_3N_4$ (layer 25) | 0–750 Å | 120–320 Å | 226 Å |

In certain example embodiments of this invention, coated articles herein may have the following low-E (low emissivity) characteristics set forth in Table 2 when measured monolithically (before any optional HT). The sheet resistances ($R_s$) herein take into account all IR reflecting layers (e.g., silver layers 9, 19) in the coating, unless expressly stated to the contrary.

TABLE 2

Low-E/Solar Characteristics (Monolithic; pre-HT)

| Characteristic | General | More Preferred | Most Preferred |
|---|---|---|---|
| $R_s$ (ohms/sq.): | <=5.0 | <=3.5 | <=3.0 |
| $E_n$: | <=0.07 | <=0.04 | <=0.03 |
| $T_{vis}/R_s$: | >=20 | >=22 | >=25 |

In certain example embodiments, coated articles herein may have the following characteristics, measured monolithically for example, after HT:

TABLE 3

Low-E/Solar Characteristics (Monolithic; post-HT)

| Characteristic | General | More Preferred | Most Preferred |
|---|---|---|---|
| $R_s$ (ohms/sq.): | <=4.5 | <=3.0 | <=2.5 |
| $E_n$: | <=0.07 | <=0.04 | <=0.03 |
| $T_{vis}/R_s$: | >=30 | >=32 | >=34 (or >=36) |

As explained above, the rather high values of the ratio $T_{vis}/R_s$ in Tables 2 and 3 are indicative of an excellent combination of high visible transmission and good solar performance (e.g., IR reflection). These high ratio values represent significant advantages over the prior art in certain example embodiments of this invention.

Moreover, coated articles including coatings 27 according to certain example embodiments of this invention have the following optical characteristics (e.g., when the coating(s) is provided on a clear soda lime silica glass substrate 1 from 1 to 10 mm thick) (HT or non-HT). In Table 4, all parameters are measured monolithically, unless stated to the contrary. In Table 4 below, $R_gY$ is visible reflection from the glass (g) side of the monolithic article, while $R_fY$ is visible reflection from the side of the monolithic article on which coating/film (f) (i.e., coating 27) is located. It is noted that the SHGC, SC, TS and ultraviolet transmission characteristics are in the context of an IG Unit (not monolithic like the rest of the data in Table 4), and the ΔE* values are of course due to HT and thus taken after HT (e.g., heat strengthening, tempering, and/or heat bending).

TABLE 4

Optical Characteristics

| Characteristic | General | More Preferred |
|---|---|---|
| $T_{vis}$ (or TY)(Ill. C, 2 deg.): | >=70% | >=75% |
| $a*_t$ (Ill. C, 2°): | −4.0 to +1.0 | −3.0 to 0.0 |
| $b*_t$ (Ill. C, 2°): | −1.0 to +4.0 | 0.0 to 3.0 |
| $R_gY$ (Ill. C, 2 deg.): | 1 to 10% | 3 to 7% |
| $a*_g$ (Ill. C, 2°): | −4.5 to +2.0 | −3.0 to 0.0 |
| $b*_g$ (Ill. C, 2°): | −5.0 to +4.0 | −4.0 to +3.0 |
| $R_fY$ (Ill. C, 2 deg.): | 1 to 7% | 1 to 6% |
| $a*_f$ (Ill. C, 2°): | −8.0 to 5.0 | −6.0 to 3.0 |
| $b*_f$ (Ill. C, 2°): | −9.0 to 10.0 | −7.0 to 8.0 |
| ΔE*$_t$ (transmissive): | <=8.0 | <=5.0, 4.0, 3.0 or 2.5 |
| ΔE*$_g$ (glass side reflective): | <=8.0 | <=5.0, 4.0, 3.0 or 2.5 |
| $T_{ultraviolet}$ (IG): | <=40% | <=35% |
| SHGC (surface #2) (IG): | <=0.45 | <=0.40 |
| SC (#2) (IG): | <=0.49 | <=0.45 |
| TS % (IG): | <=40% | <=37% |
| Haze (post-HT): | <=0.4 | <=0.35 |

The value(s) ΔE* is important in determining whether or not there is matchability, or substantial color matchability upon HT, in the context of certain embodiments of this invention. Color herein is described by reference to the conventional a*, b* values. The term Δa* is simply indicative of how much color value a* changes due to HT (the same applies to Δb*). If color changes too much upon HT (e.g., if ΔE* is over 10), then the product may not be commercially acceptable. A very high value of ΔE* may also be indicated of destruction of the Ag layer during HT, and/or of massive haze.

The term ΔE* (and ΔE) is well understood in the art and is reported, along with various techniques for determining it, in ASTM 2244-93 as well as being reported in Hunter et. al., *The Measurement of Appearance*, $2^{nd}$ Ed. Cptr. 9, page 162 et seq. (John Wiley & Sons, 1987). As used in the art, ΔE* (and ΔE) is a way of adequately expressing the change (or lack thereof) in reflectance and/or transmittance (and thus color appearance, as well) in an article after or due to HT. ΔE may be calculated by the "ab" technique, or by the Hunter technique (designated by employing a subscript "H"). ΔE corresponds to the Hunter Lab L, a, b scale (or $L_h$, $a_h$, $b_h$). Similarly, ΔE* corresponds to the CIE LAB Scale L*, a*, b*. Both are deemed useful, and equivalent for the purposes of this invention. For example, as reported in Hunter et. al. referenced above, the rectangular coordinate/scale technique (CIE LAB 1976) known as the L*, a*, b* scale may be used, wherein:

L* is (CIE 1976) lightness units a* is (CIE 1976) red-green units b* is (CIE 1976) yellow-blue units and the distance $\Delta E^*$ between $L^*_o\, a^*_o\, b^*_o$ and $L^*_1\, a^*_1\, b^*_1$ is:

$$\Delta E^* = \{(\Delta L^*)^2 + (\Delta a^*)^2 + (\Delta b^*)^2\}^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (or coated article) before heat treatment and the subscript "1" represents the coating (coated article) after heat treatment; and the numbers employed (e.g., a*, b*, L*) are those calculated by the aforesaid (CIE LAB 1976) L*, a*, b* coordinate technique. In a similar manner, $\Delta E$ may be calculated using equation (1) by replacing a*, b*, L* with Hunter Lab values $a_h$, $b_h$, $L_h$. Also within the scope of this invention and the quantification of $\Delta E^*$ are the equivalent numbers if converted to those calculated by any other technique employing the same concept of $\Delta E^*$ as defined above.

As explained above, coated articles according to certain example embodiments of this invention may have a $\Delta E^*$ value (glass side reflective and/or transmissive) due to HT which is no greater than about 8.0, more preferably no greater than about 5.0, even more preferably no greater than about 4.0, even more preferably no greater than about 3.0, and sometimes no greater than about 2.5. These values are indicative of commercially acceptable heat treatable coated articles.

In other example embodiments of this invention, it has been found that by thinning the bottom titanium oxide ($TiO_x$, where $1<=x<=3$) layer 3 compared to a 75 Å thickness of a conventional coating, glass side reflective a* color can be significantly improved (i.e., more neutral in this case) at high viewing angles. In certain example embodiments of this invention, the titanium oxide layer 3 is thinned from a known conventional 75 Å thickness to a thickness of from 20 to 60 Å, more preferably from 30 to 60 Å, and even more preferably from 40 to 50 Å. In certain example embodiments, such thinning of the titanium oxide layer 3 allows the coated article to have color (a* and/or b*) that is more neutral at a high viewing angle such as 45 and/or 60 degrees off-axis, than at a normal (0 degrees on-axis) viewing angle. This is advantageous in that (a) the color of the coated article is less offensive at high viewing angles (i.e., a more neutral color at angle can be achieved), and/or (b) the off-axis color of the coating may be easier to approximately match with other coatings. In alternative embodiments of this invention, layer 3 need not be provided, or it may be replaced with a metal nitride inclusive layer (e.g., SiN) so that a metal nitride layer is in direct contact with the glass.

In certain example embodiments of this invention, it has also been found that the respective thicknesses of the infrared (IR) reflecting layers (e.g., Ag layers) 9 and 19 may also play a part in stabilizing a* and/or b* values upon significant changes in viewing angle. In particular, making the upper IR reflecting layer at least 20 Å thicker, more preferably at least 30 Å thicker than the lower IR reflecting layer has been found to be helpful in improving color at high viewing angles in some instances. In this respect, while Table 2 above indicates the sheet resistance of the overall coating, it is noted that the sheet resistance ($R_s$) of each individual silver layer (9 and 19) may be different from one another in certain embodiments of this invention. In certain example embodiments, the upper silver layer 19 has a lower sheet resistance than does lower silver layer 9. For example, in an example where the entire coating has a sheet resistance ($R_s$) of 2.9 ohms/square, the upper silver layer 19 may have a sheet resistance of 4.9 and the lower silver layer 9 a sheet resistance of 7.0. In certain example embodiments of this invention, the lower silver layer 9 may have a sheet resistance ($R_s$) at least 10% higher than that of the upper silver layer 19, more preferably at least 20% higher.

EXAMPLE 1

The following examples are provided for purposes of example only, and are not intended to be limiting. The following Examples were made via sputtering so as to have approximately the layer stack set forth below, from the clear glass substrate outwardly. The listed thicknesses are approximations:

TABLE 5

LAYER STACK FOR EXAMPLES

| Layer | Thickness |
|---|---|
| Glass Substrate | about 3 to 3.4 mm |
| $TiO_x$ | 40 Å |
| $Si_xN_y$ | 113 Å |
| $ZnAlO_x$ | 100 Å |
| Ag | 95 Å |
| $NiCrO_x$ | 26 Å |
| $SnO_2$ | 483 Å |
| $Si_xN_y$ | 113 Å |
| $ZnAlO_x$ | 100 Å |
| Ag | 131 Å |
| $NiCrO_x$ | 26 Å |
| $SnO_2$ | 100 Å |
| $Si_3N_4$ | 226 Å |

It is believed, as explained above, that the thin nature of the titanium oxide layer is a significant factor in achieving the fairly neutral a* and/or b* values at high viewing angles such as at 60 degrees off-axis. It is also believed that making the upper Ag layer significantly thicker (e.g., at least 30 Å thicker) than the lower Ag layer helps provide neutral coloration at high viewing angles.

Moreover, as explained herein, the bottom two silicon nitride layers ($Si_xN_y$) are preferably non-stoichiometric and Si-rich. As explained above, it has been found that the use of a combination of a Si-rich silicon nitride inclusive layer and a zinc oxide inclusive layer (e.g., $ZnAlO_x$) under a layer comprising silver allows the silver to be deposited in a manner which causes its sheet resistance to be lessened (which is desirable) compared to if other material(s) were under the silver. In certain example embodiments, the Si-rich silicon nitride inclusive ($Si_xN_y$) layer(s) allows the ratio $T_{vis}/R_s$ to be increased significantly after HT.

The process used in forming the coated article of Example 1 is set forth below. In Example 1, the bottom two silicon nitride layers were formed in a Si-rich manner, and the two nickel chrome oxide layers were formed so as to be oxidation graded as described in US 2002/0064662. The gas flows (argon (Ar), oxygen (O), and nitrogen (N)) in the below table are in units of ml/minute, and include both tuning gas and gas introduced through the main. The λ setting in the sputter coater is in units of mV, and as will be appreciated by those skilled in the art is indicative of the partial pressure of the gas being used in the sputter chamber (i.e., a lower λ setting indicates a higher oxygen gas partial pressure). Thus, for example, a lower λ setting in the case of depositing a ZnAlO layer would mean a higher oxygen gas partial pressure which in turn would mean a less metallic (more oxidized) ZnAlO layer. The linespeed was about 5 m/min. The pressures are in units of mbar×10$^{-3}$. The cathodes used for sputtering the silver and nickel chrome oxide layers included planar targets, and the others dual C-Mag targets. The silicon (Si) targets, and thus the silicon nitride layers, were doped with about 10% aluminum (Al), so as to be indicated by SiAl targets. The Zn targets in a similar manner were also doped with Al, so as to be indicated by ZnAl targets. The silver and nickel chrome oxide layers were sputtered using DC power sputtering, while the other layers were sputtered using a mid-frequency AC type system.

TABLE 6

SPUTTER PROCESSING USED IN EXAMPLE 1

| Cathode | Target | Power(kW) | Ar | O | N | λ Setting | Pressure |
|---|---|---|---|---|---|---|---|
| C11 | Ti | 34.6 | 350 | 21.6 | 0 | n/a | 3.65 |
| C12 | Ti | 35.4 | 350 | 4.56 | 0 | n/a | 4.56 |
| C15 | SiAl | 52.2 | 250 | 0 | 305 | n/a | 4.38 |
| C24 | ZnAl | 43 | 250 | 556 | 0 | 175 | 5.07 |
| C32-a | Ag | 3.1 | 250 | 0 | 0 | 0 | 3.69 |
| C32-b | Ag | 3.2 | n/a | 0 | 0 | 0 | n/a |
| C33 | NiCr | 15.7 | 212 | 96 | 0 | 0 | 3.07 |
| C41 | Sn | 46.8 | 200 | 651 | 75 | 171.4 | 5.30 |
| C42 | Sn | 44.2 | 200 | 651 | 75 | 171.4 | 6.68 |
| C43 | Sn | 45.2 | 200 | 651 | 75 | 171.4 | 6.40 |
| C44 | Sn | 49.9 | 200 | 651 | 75 | 171.4 | 6.69 |
| C45 | Sn | 39.8 | 200 | 651 | 75 | 171.4 | 5.17 |
| C52 | SiAl | 51.5 | 250 | 0 | 322 | n/a | 4.11 |
| C55 | ZnAl | n/a | 250 | 475 | 0 | 178 | 4.37 |
| C62-a | Ag | 4.5 | 250 | 0 | 0 | n/a | 3.43 |
| C62-b | Ag | 4.6 | n/a | 0 | 0 | n/a | n/a |
| C64 | NiCr | 14.8 | 250 | 93 | 0 | n/a | 4.23 |
| C71 | Sn | 41.9 | 200 | 765 | 75 | 172 | 5.29 |
| C73 | SiAl | 54.6 | 225 | 0 | 430 | n/a | 3.93 |
| C74 | SiAl | 53.3 | 225 | 0 | 430 | n/a | 5.86 |
| C75 | SiAl | 54.4 | 225 | 0 | 430 | n/a | 2.52 |

After being sputter deposited onto the glass substrate, Example 1 had the following characteristics after being subjected to HT at about 625 degrees C. for about 7.7 minutes, measured monolithically and in the center of the coated article:

TABLE 7

Characteristics of Example 1 (Monolithic - HT)

| Characteristic | Example 1 |
|---|---|
| Visible Trans. ($T_{vis}$ or TY)(Ill. C 2 deg.): | 81.04% |
| a* | −2.18 |
| b* | 0.93 |
| L* | 92.15 |
| $\Delta E^*_t$ | 4.54 |
| Glass Side Reflectance (RY)(Ill C, 2 deg.): | 5.20% |
| a* | 0.06 |
| b* | −2.06 |
| L* | 27.31 |
| $\Delta E^*_g$ | 2.44 |
| Film Side Reflective (FY)(Ill. C, 2 deg.): | 4.59 |
| a* | −3.45 |
| b* | 5.64 |
| L* | 25.54 |
| $R_s$ (ohms/square) (pre-HT): | 2.9 |
| $R_s$ (ohms/square) (post-HT): | 2.1 |
| $T_{vis}/R_s$ (post-HT): | 38.6 |

EXAMPLES 2–4

Advantages of Si-Rich

Examples 2–4 illustrate that the use of a Si-rich silicon nitride layer(s) (4 and/or 14). Examples 2–4 were all sputter deposited in approximately the same way as Example 1 above, except that the gas flow was adjusted for the bottom silicon nitride layer 4 so that in Examples 2–3 the bottom silicon nitride layer was Si-rich, whereas in Example 4 the bottom silicon nitride layer was stoichiometric (i.e., $Si_3N_4$). In these examples, the silicon nitride layer 14 was Si-rich, and the overcoat silicon nitride layer 25 was stoichiometric. It is noted that the layer 4 was Si-rich in Example 1. The purpose of these Examples is to show that by making the bottom silicon nitride layer 4 silicon rich, reduced sheet resistance can be achieved especially after HT. Example 3 was more Si-rich than Example 2. In the table below, HT 1 means heat treated for about 7.7 minutes in an oven at a temperature of about 650 degrees C., whereas HT 2 means HT for about 5.4 minutes in an oven at about 625 degrees C. The ratio $T_{vis}/R_s$ in the table below is for HT 1.

TABLE 8

Results of Examples 2–4

| Ex. | $R_s$ (pre-HT) | $T_{vis}$ (pre-HT) | $R_s$ (HT1) | $T_{vis}$ (HT1) | $R_s$ (HT2) | $T_{vis}$ (HT2) | $T_{vis}/R_s$ |
|---|---|---|---|---|---|---|---|
| 2 (Si-rich) | 3.2 | 69.3 | 2.3 | 79.35 | 2.3 | 80.16 | 34.50 |
| 3 (Si-rich) | 3.2 | 69.5 | 2.3 | 79.69 | 2.3 | 79.00 | 34.64 |
| 4 ($Si_3N_4$) | 3.3 | 69.7 | 2.4 | 79.17 | 2.4 | 80.16 | 32.98 |

It can be seen from the above table that the Si-rich examples (Examples 2–3) for layer 4 were able to achieve lower sheet resistance values, and higher $T_{vis}/R_s$ ratios than the stoichiometric example (Example 4).

EXAMPLES 5–10

Partial Pressure Differences

Examples 5–10 are for illustrating the surprising finding that by using a lower oxygen gas partial pressure (e.g., oxygen gas partial pressure) for the lower zinc oxide inclusive layer 7 than for the upper zinc oxide inclusive layer 17, improved (i.e., higher) $T_{vis}/R_s$ ratios can be achieved. The coated articles of Examples 5–10 were deposited in the same manner as Example 1 above, except that in Examples 5–7 the λ setting was adjusted for the bottom zinc oxide inclusive layer 7, and in Examples 8–10 the λ setting was adjusted for the top zinc oxide inclusive layer 17. As will appreciated by those skilled in the art, the lower the λ setting on the sputter coater, the less metallic the resulting layer, the more oxidized (when oxygen gas is at issue) the resulting layer, and the higher the gas (eg., oxygen) partial pressure in the sputter coater for that chamber. The heat treatment in Table below was for about 5.4 minutes in an oven at about 625 degrees C. The ratios $T_{vis}/R_s$ were taken after HT.

TABLE 9

Examples 5–10

| Ex. | λ (layer 7) | λ (layer 17) | $R_s$ (pre-HT) | $T_{vis}$ (pre-HT) | $R_s$ (HT) | $T_{vis}$ (HT) | $T_{vis}/R_s$ |
|---|---|---|---|---|---|---|---|
| 5 | 179 | 178 | 3.23 | 69.4 | 2.33 | 80.11 | 34.38 |
| 6 | 175 | 178 | 3.18 | 69.5 | 2.31 | 80.48 | 34.84 |
| 7 | 183 | 178 | 3.31 | 69.3 | 2.44 | 79.94 | 32.76 |
| 8 | 179 | 179 | 3.26 | 69.4 | 2.32 | 79.71 | 34.35 |
| 9 | 179 | 174 | 3.28 | 69.2 | 2.46 | 79.86 | 32.46 |
| 10 | 179 | 182 | 3.22 | 69.8 | 2.35 | 80.63 | 34.31 |

From Table 9 above, it can be seen that, surprisingly, better (i.e., higher) $T_{vis}/R_s$ ratios are achievable when the lamda (λ) setting for the lower zinc oxide inclusive layer 7 is lower (e.g., Ex. 6) and when the λ setting for the upper zinc oxide inclusive layer 17 is higher (e.g., Exs. 5–8 and 10). Thus, it can be seen that the best $T_{vis}/R_s$ ratios are achievable in Example 1 when the λ setting for the lower layer 7 is lower than that of the upper layer 17. As explained previously, a lower λ setting on the sputter coater translates into a higher oxygen partial pressure, and thus a more oxidized (less metallic) zinc oxide inclusive layer. In other words, as shown in Tables 7 and 9 above, the best results are achievable when the oxygen partial pressure is higher (e.g., at least 1% higher, more preferably at least 2% higher) for deposition of the lower ZnO inclusive layer 7 than for the upper ZnO inclusive layer 17.

Another surprising result associated with certain example embodiments of this invention is that coated articles herein may have improved mechanical durability compared to coated articles described in US 2002/0064662. While the reason for the improved durability is not clear, it is believed that the combination of the silicon nitride/zinc oxide/silver may be a factor involved.

Any of the aforesaid monolithic coated articles may be used in an IG unit as shown in FIG. 2. Of course, when any of the above monolithic coated articles are coupled with another substrate(s) to form an IG unit, transmission will drop in the resulting IG unit. Thus, in certain example embodiments of this invention, IG units using coated articles herein may have a visible transmission of at least about 60%, more preferably of at least about 65%, and most preferably of at least about 68%.

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_xY$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emittance" and "transmittance" are well understood in the art and are used herein according to their well known meaning. Thus, for example, the terms visible light transmittance (TY), infrared radiation transmittance, and ultraviolet radiation transmittance ($T_{uv}$) are known in the art. Total solar energy transmittance (TS) is then usually characterized as a weighted average of these values from 300 to 2500 nm (UV, visible and near IR). With respect to these transmittances, visible transmittance (TY), as reported herein, is characterized by the standard CIE Illuminant C, 2 degree observer, technique at 380–720 nm; near-infrared is 720–2500 nm; ultraviolet is 300–380 nm; and total solar is 300–2500 nm. For purposes of emittance, however, a particular infrared range (i.e. 2,500–40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available UltraScan XE spectrophotometer manufactured by Hunter Lab. This device measures and reports visible transmittance directly. As reported and measured herein, visible transmittance (i.e. the Y value in the CIE tristimulus system, ASTM E-308-85) uses the Ill. C., 2 degree observer.

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

The terms "heat treatment" and "heat treating" as used herein mean heating the article to a temperature sufficient to achieve thermal tempering, bending, and/or heat strengthening of the glass inclusive article. This definition includes, for example, heating a coated article in an oven or furnace at a temperature of least about 580 or 600 degrees C. for a sufficient period to allow tempering, bending, and/or heat strengthening. In some instances. the HT may be for at least about 4 or 5 minutes, or more.

The term "shading coefficient" (SC) is a term well understood in the art and is used herein according to its well known meaning. It is determined according to ASHRAE Standard 142 "Standard Method for Determining and Expressing the Heat Transfer and Total Optical Properties of Fenestration Products" by ASHRAE Standards Project Committee, SPC 142, September 1995. SC may be obtained by dividing solar heat gain coefficient (SHGC) by about 0.87. Thus, the following formula may be used: SC=SHGC/0.87.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A heat treated coated article comprising:
    a multi-layer coating supported by a glass substrate, wherein the coating comprises at least the following layers from the glass substrate outwardly:
    a first layer comprising zinc oxide;
    a first layer comprising silver;
    a first layer comprising tin oxide;
    a layer comprising silicon nitride;
    a second layer comprising zinc oxide;
    a second layer comprising silver; and
    a layer comprising tin oxide and/or silicon nitride;
    wherein the coated article has a ratio $T_{vis}/R_s$ of at least 32 after heat treatment (where $T_{vis}$ is visible transmission (%) and $R_s$ is sheet resistance of the coating in units of ohms/square) and a ΔE* value (glass side reflective and/or transmissive) of less than or equal to about 8 due to the heat treatment.

2. The coated article of claim 1, wherein the coated article has a ratio $T_{vis}/R_s$ of at least 34 after heat treatment.

3. The coated article of claim 1, wherein the coated article has a ratio $T_{vis}/R_s$ of at least 36 after heat treatment.

4. The coated article of claim 1, wherein the coated article has a visible transmission of at least 65%, measured monolithically, after heat treatment.

5. The coated article of claim 1, wherein the coated article has a sheet resistance ($R_s$) of less than or equal to 4.0 after heat treatment.

6. The coated article of claim 1, wherein the coated article has a ΔE* value (glass side reflective and/or transmissive) of less than or equal to about 5 due to the heat treatment.

7. The coated article of claim 1, wherein the coated article has a ΔE* value (glass side reflective and/or transmissive) of less than or equal to about 4 due to the heat treatment.

8. The coated article of claim 1, wherein the coated article has a ΔE* value (glass side reflective and/or transmissive) of less than or equal to about 3 due to the heat treatment.

9. An IG window unit including the coated article of claim 1, wherein the IG window unit further comprising another glass substrate, wherein the IG window unit has a visible transmission of at least about 65%.

10. The coated article of claim 1, further comprising a layer comprising titanium oxide having a thickness of from 20 to 60 Å located between the glass substrate and the first layer comprising zinc oxide, and wherein the coated article has a Total Solar (TS) value of no greater than 40%.

11. The coated article of claim 1, wherein the coated article is characterized by the following transmissive color at a normal viewing angle, after heat treatment:

| | |
|---|---|
| a* | −4.5 to +1.0 |
| b* | −1.0 to +4.0. |

12. The coated article of claim 1, further comprising a layer comprising an oxide of Ni and/or Cr located between the first layer comprising silver and the first layer comprising tin oxide.

13. A heat treated coated article comprising:
    a multi-layer coating supported by a glass substrate, wherein the coating comprises at least the following layers from the glass substrate outwardly:
    a first layer comprising zinc oxide;
    a first layer comprising silver;
    a layer comprising tin oxide;
    a second layer comprising zinc oxide;
    a second layer comprising silver; and
    a layer comprising tin oxide and/or silicon nitride;
    wherein the coated article has a ratio $T_{vis}/R_s$ of at least 32 after heat treatment (where $T_{vis}$ is visible transmission (%) and $R_s$ is sheet resistance of the coating in units of ohms/square) and a ΔE* value (glass side reflective and/or transmissive) of less than or equal to about 8 due to the heat treatment.

14. The coated article of claim 13, wherein the coated article has a ratio $T_{vis}/R_s$ of at least 34 after heat treatment.

15. The coated article of claim 13, wherein the coated article has a ratio $T_{vis}/R_s$ of at least 36 after heat treatment.

16. The coated article of claim 13, wherein the coated article has a visible transmission of at least 65%, measured monolithically, after heat treatment.

17. The coated article of claim 13, wherein the coated article has a sheet resistance ($R_s$) of less than or equal to 4.0 after heat treatment.

18. The coated article of claim 13, wherein the coated article has a ΔE* value (glass side reflective and/or transmissive) of less than or equal to about 5 due to the heat treatment.

* * * * *